United States Patent
Ahmad et al.

(10) Patent No.: US 7,911,964 B1
(45) Date of Patent: *Mar. 22, 2011

(54) ENTITY BASED QUALITY OF SERVICE RESPONSE FOR PACKET SERVICE SESSIONS

(75) Inventors: Imtiaz Ahmad, Overland Park, KS (US); Anthony C. Wells, Overland Park, KS (US)

(73) Assignee: Sprint Communications Company L.P., Overland PArk, KS (US)

(*) Notice: Subject to any disclaimer, the term of this patent is extended or adjusted under 35 U.S.C. 154(b) by 1130 days.

This patent is subject to a terminal disclaimer.

(21) Appl. No.: 11/265,480

(22) Filed: Nov. 2, 2005

(51) Int. Cl.
*H04J 1/16* (2006.01)
(52) U.S. Cl. ......... 370/252; 370/232; 370/235; 370/237
(58) Field of Classification Search .................. 370/241, 370/241.1, 242–253, 229–236.1, 395.21, 370/396; 379/1.03, 29.01
See application file for complete search history.

(56) References Cited

U.S. PATENT DOCUMENTS

| | | | |
|---|---|---|---|
| 6,058,102 A * | 5/2000 | Drysdale et al. | 370/252 |
| 6,910,024 B2 * | 6/2005 | Krishnamurthy et al. | 705/400 |
| 7,142,512 B1 * | 11/2006 | Kobayashi et al. | 370/232 |
| 2002/0059453 A1 * | 5/2002 | Eriksson et al. | 709/238 |
| 2005/0064870 A1 * | 3/2005 | Gabara et al. | 455/438 |
| 2005/0117586 A1 * | 6/2005 | Ikeda et al. | 370/395.21 |

* cited by examiner

*Primary Examiner* — Huy D Vu
*Assistant Examiner* — Dady Chery

(57) ABSTRACT

A quality management system comprising an interface configured to receive quality information for a session having traffic transported by a communication network between a first end system and a second end system, and transmit a feedback message, and a processing system configured to process the quality information to determine an entity associated with the session, a required service level for the entity, and a delivered service level for the session, process the delivered service level with the required service level to determine a response for the session, and generate the feedback message indicating the response.

16 Claims, 8 Drawing Sheets

ENTITY BASED QUALITY OF SERVICE RESPONSE FOR PACKET SERVICE SESSIONS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to communication technologies, and in particular, to providing quality of service remedies for packet based services.

2. Description of the Prior Art

Recent advances in communication technologies have made possible the widespread use of packet based services. For example, Voice over Internet Protocol (VOIP) service has become very popular. One problem with VOIP service is that the quality of service delivered to end users is often times unreliable or poor. End users frequently experience garbled conversations due to delay, packet loss, and jitter.

VOIP service can be provided in various ways. Peer to peer VOIP service requires specialized software at each end point of a call. Call traffic is exchanged between the end points over a single or multiple interconnected networks, such as the Internet. One advantage to peer to peer VOIP is that it is very flexible—an end point can be established anywhere a user has Internet access. A draw back is that there are not centralized control mechanisms in place for providing call control. As a result, peer to peer VOIP calling is notorious for quality of service problems. Skype is an example of a peer to peer VOIP service.

Carrier grade VOIP services are usually provided on a larger scale than peer to peer VOIP service and typically include more robust call control mechanisms. For example; a carrier grade VOIP network typically includes a soft switch or other equipment for providing centralized call control. In addition, most carrier grade VOIP networks include gateways for interfacing calls to other networks such as the public switched telephone network (PSTN). The quality of service of carrier grade VOIP service is generally better than that of peer to peer VOIP service, but still does not reach the high levels customarily associated with plain old telephone service (POTS).

One problem facing VOIP service providers with respect to quality of service, whether under the peer to peer model or the carrier grade model, is that most VOIP service is provided across multiple networks, not all of which are controlled by any one particular service provider. For example, many service providers own and operate their own core service network. End users are often times linked to the core network by an intermediate access network, such as a multiple service cable network. Unfortunately, service providers typically have no control over or access to access networks, and are therefore unable to provide or enforce high quality of service. In the case of peer to peer VOIP service, the service provider might not own or operate any network at all, thereby increasing the likelihood that end users will encounter quality of service problems.

Some quality of service solutions have been provided in the prior art. The real time control protocol (RTCP) allows end devices to exchange information on the quality of service of a particular session. For example, RTCP messages might include packet loss, jitter, and delay statistics.

While many prior art solutions help to improve the overall quality of service sessions, many VOIP service providers remain without effective quality of service feedback and assurance capabilities. For example, end users are typically unaware of the causes of low quality of service. As a result, end users become dissatisfied with their service provider, even though the cause of the low quality of service may have been the responsibility of an access provider, such as multiple service cable network operators. In another example, service providers are often times unable to remedy low quality of service in a timely or relevant manner, thereby further exacerbating the dissatisfaction of end users.

SUMMARY OF THE INVENTION

An embodiment of the invention helps solve the above problems and other problems by providing systems, methods, and software that allow service providers to remedy quality of service issues in a manner that is timely and relevant from the perspective of an interested entity, such as an end user or enterprise. In an embodiment of the invention, a quality management system comprises an interface configured to receive quality information for a session having traffic transported by a communication network between a first end system and a second end system, and transmit a feedback message, and a processing system configured to process the quality information to determine an entity associated with the session, a required service level for the entity, an a delivered service level for the session, process the delivered service level with the required service level to determine a response for the session, and generate the feedback message indicating the response.

In an embodiment of the invention, the quality management system receives the quality information from the first end system.

In an embodiment of the invention, the quality management system receives the quality information from an intermediate system in the communication network.

In an embodiment of the invention, the quality management system receives a real time control protocol (RTCP) message indicating the quality information.

In an embodiment of the invention, the response comprises providing the entity with service credits.

In an embodiment of the invention, the response comprises a notification that the delivered service level was of a higher quality than the required service level.

In an embodiment of the invention, the response comprises a notification that the delivered service level was of a lower quality than the required service level.

In an embodiment of the invention, a method of operating a quality management system comprises receiving quality information for a session having traffic transported by a communication network between a first end system and a second end system, processing the quality information to determine an entity associated with the session, a required service level for the entity, and a delivered service level for the session, processing the delivered service level with the required service level to determine a response for the session, and generating and transmitting a feedback message indicating the response.

In an embodiment of the invention, a quality management network comprises a communication network and a quality management system coupled to the communication network. The communication network is configured to transport traffic for a session between a first end system and a second end system. The quality management system is configured to receive quality information for the session, process the quality information to determine an entity associated with the session, determine a required service level for the entity and determine a delivered service level for the session, process the delivered service level with the required service level to determine a response for the session, generate a feedback message indicating the response, and transmit the feedback message.

BRIEF DESCRIPTION OF THE DRAWINGS

The same reference number represents the same element on all drawings.

DETAILED DESCRIPTION OF THE PREFERRED EMBODIMENT

FIGS. 1-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

First Embodiment Configuration and Operation

FIGS. 1-3

Figure 1:
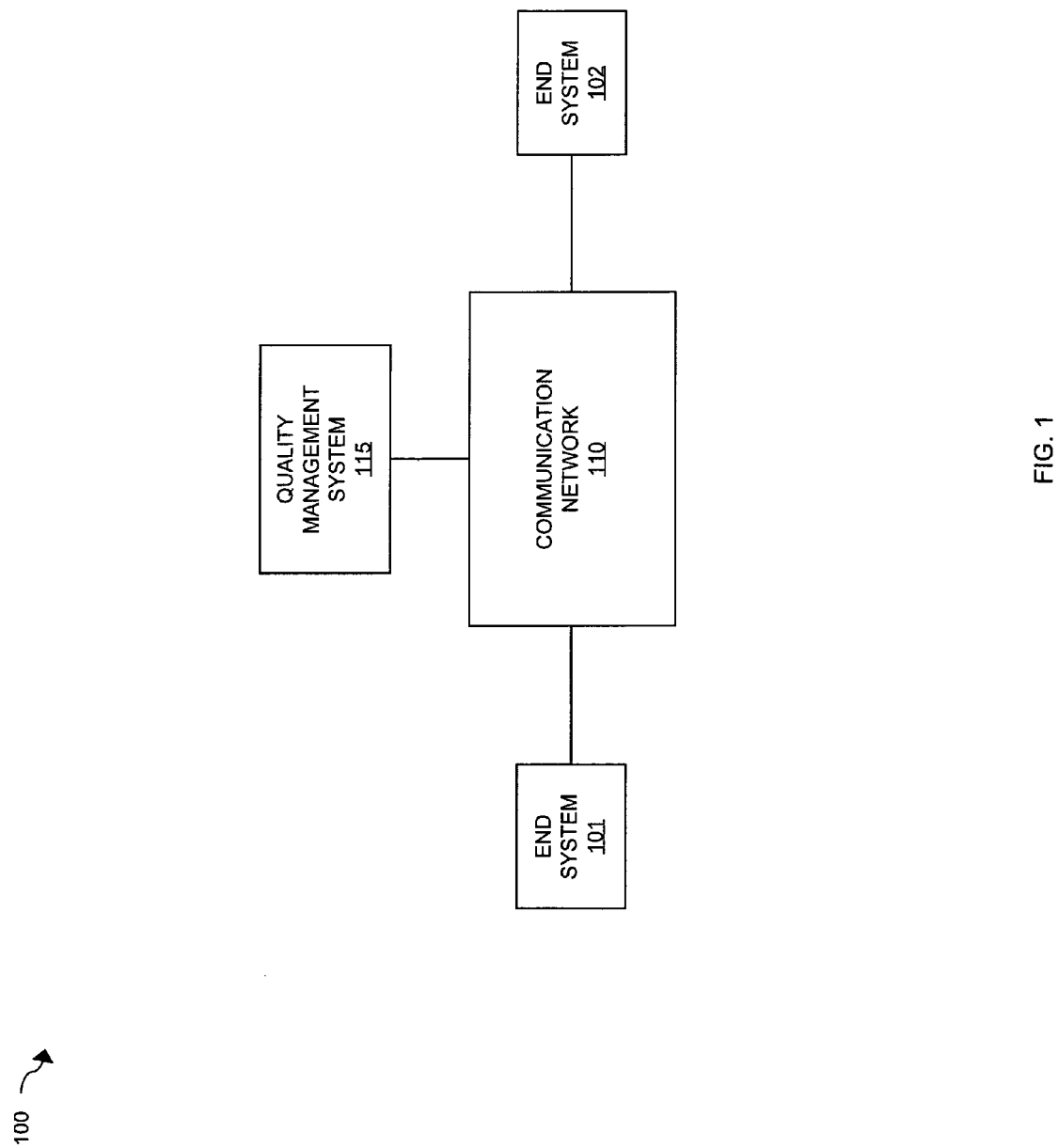
FIG. 1 illustrates a quality management network in an embodiment of the invention.

FIG. 1 illustrates quality management network 100 in an embodiment of the invention. Quality management network 100 includes communication network 110, end system 102, end system 101, and quality management system (QMS) 115. End systems 101 and 102 are coupled to communication network 110. Similarly, QMS 115 is coupled to communication network 110.

Communication network 110 could be any asynchronous network or collection of networks capable of transporting packet communications. End system 101 could be any end system capable of sending and receiving packet communications to and from communication network 110. Similarly, end system 102 could be any end system capable of sending and receiving packet communications to and from communication network 110. QMS 115 could also be any system capable of sending and receiving packet communications to and from communication network 110. Packet communications could include, for example, session traffic, quality information, and feedback messages, as well as other types of packet communications.

Figure 2:
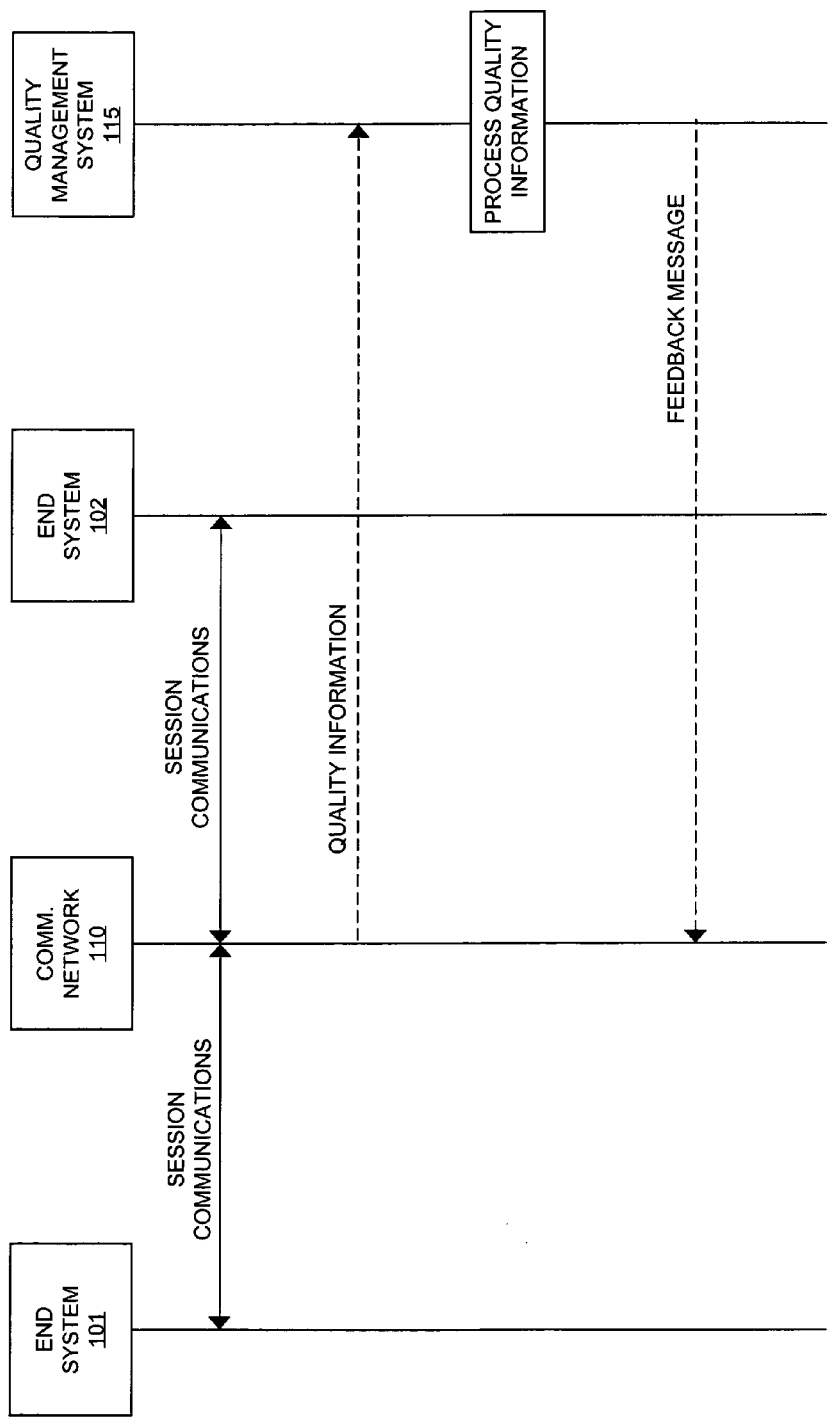
FIG. 2 illustrates the operation of a quality management network in an embodiment of the invention.

FIG. 2 is a communication flow diagram illustrating the operation of quality management network 100 in an embodiment of the invention. In operation, end system 101 sends or receives session traffic to or from end system 102 over communication network 110. End system 102 also sends or receives session traffic to or from end system 101 over communication network 110. The session traffic is processed to determine quality information for the session. For example, the quality information could indicate certain performance metrics, such as bandwidth, latency, packet loss, jitter, or wireless signal strength, as well as other performance metrics. The quality information could be determined by end system 101 and 102, as well as by elements of communication network 110. The quality information could then be provided to QMS 115.

Figure 3:
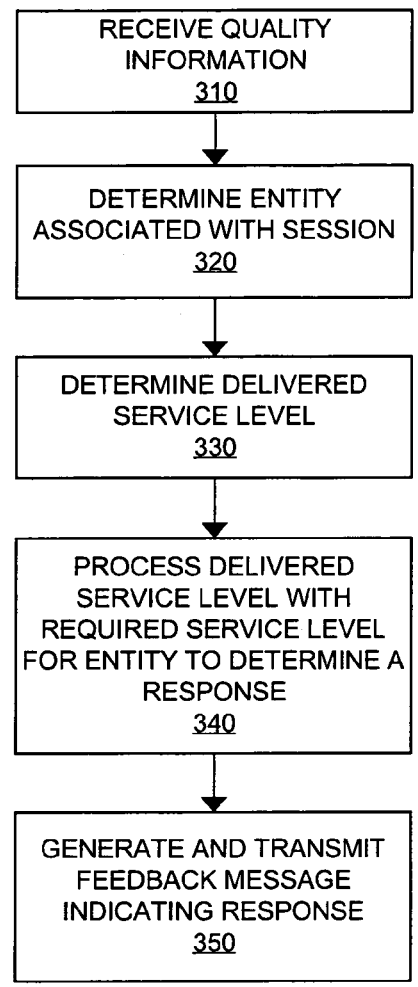
FIG. 3 illustrates the operation of a quality management system in an embodiment of the invention.

FIG. 3 illustrates the operation of QMS 115 in an embodiment of the invention. To begin, QMS 115 receives the quality information (Step 310). QMS 115 processes the quality information to an entity associated with the session (Step 320). QMS 115 also processes the quality information to determine a delivered service level for the session (Step 330). Upon determining the delivered service level, QMS 115 processes the delivered service level with a required service level for the entity to determine a response to the delivered service level (Step 340). QMS 115 then generates and transmits a feedback message that indicates the determined response (Step 350).

In an example of the invention, QMS 115 could receive the quality information from either end system 101 or end system 102. QMS 115 could receive the quality information in the form of, for example, a real time control protocol (RTCP) message. The message could be addressed directly for QMS 115. Alternatively, a probe situated in communication network 110 could read and copy RTCP messages passed between end systems 101 and 102 and responsively transmit the messages to QMS 115.

In another example of the invention, QMS 115 could transmit the feedback message to either end system 101 or end system 102. Alternatively, QMS 115 could transmit the feedback message to a third-party, such as a communications administrator for an enterprise. In such a situation, the feedback message would be addressed to the administrator, rather than to the end users of end systems 101 and 102. In another example, QMS 115 could send feedback messages to both end users and third-parties.

In yet another example of the invention, the response indicated in the feedback messages could be a response to be carried out by a service provider. For example, the response could indicate that a service credit is to be applied to the accounts of the entity in response to a delivered quality of service level that is below the required quality of service level. In another example, the response could indicate that the delivered service level was of a higher quality level than the required quality of service level for the entity. In such a case, the response could indicate an offer for the entity to upgrade to the higher quality of service level.

Advantageously, quality management network 100 provides for responding on an entity-specific and session by session basis to delivered quality of service levels. In such a manner, entities associated with sessions can be notified of the reasons for low quality of service issues that arise during particular sessions. In addition, entities can be notified of actual and specific responses that will be taken by service providers in response to delivered quality of service levels that do not meet required quality of service levels.

Second Embodiment Configuration and Operation

FIGS. 4-7

Figure 4:
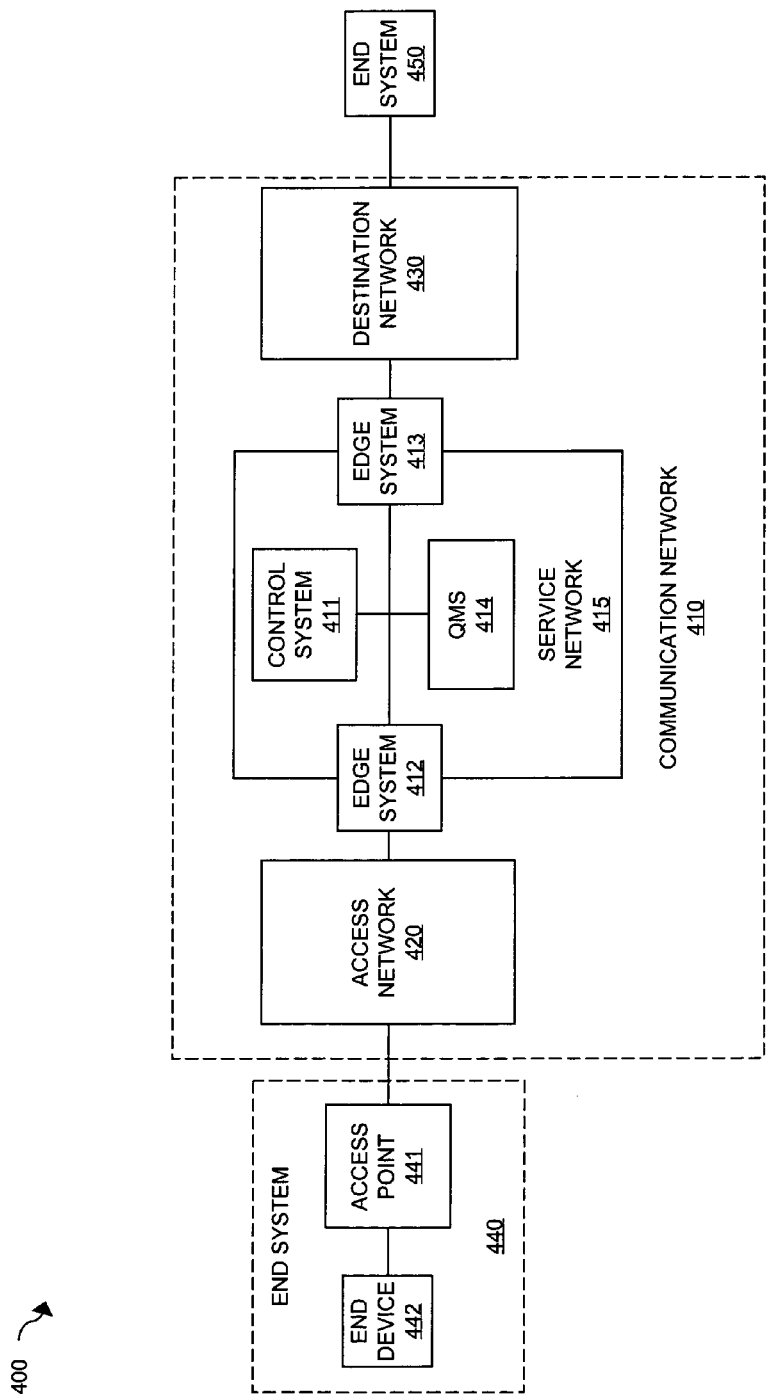
FIG. 4 illustrates a quality management network in an embodiment of the invention.

FIG. 4 illustrates quality management network 400 in an embodiment of the invention. Quality management network 400 includes communication network 410 operatively in communication with end system 440 and end system 450. Communication network 410 includes service network 415, access network 420, and destination network 430. Service network 415 includes control system 411, edge system 412, edge system 413, and quality management system (QMS) 414. End system 440 includes access point 441 and end device 442.

End device 442 could be any end device capable of communicating on a service session, such as a VOIP session or some other multi-media session. End device 442 could be, for example, a phone, a personal digital assistant, a music device, a video device, or a personal computing device, as well as other types of end devices. End device 442 could be a wireless device. Access point 441 could be any access system capable of providing access to access network 420. For example, access point 441 could be a terminal adapter device or a wireless base station, as well as other types of access points.

Access network 420 could be any access network capable of providing access to service network 415. Access network 420 could be, for example, a multiple service cable network or a digital subscriber line (DSL) network, as well as other types of access networks. Service network 415 could be any network capable of providing a service to end users via end devices, such as end device 442. Destination network 430 could be any network capable of carrying session communications between service network 415 and end system 450. End system 450 could be any system capable of communicating on a service session. End system 450 could be an end device similar to end device 442. Alternatively, end system 450 could be an application content source system such as a service platform, a music server system, or a video server system.

Control system 411 provides session control for services provided by service network 415. Control system 411 could be, for instance, a soft switch or an edge proxy server, as well as other types of session control equipment. Edge system 412 provides a peering point between service network 415 and access network 420. Edge system 412 could provide border control functions and gateway functions for traffic exchanged between access network 420 and service network 415. Likewise, edge system 413 provides a peering point between destination network 430 and service network 415. Edge system 413 could also provide border control functions and gateway functions for traffic exchanged between destination network 430 and service network 415.

In operation, a session is established between end device 442 and end system 450. Session traffic is exchanged between end device 442 and end system 450. Considering the perspective whereby end device 442 sends traffic to end system 450, end device 442 first transmits the traffic to access point 441. Access point 441 receives, processes, and transmits the traffic over access network 420 to edge system 412. Edge system 412 also processes and transmits the traffic to edge system 413. Edge system 413 processes and passes the traffic to destination network 430. The traffic is routed over destination network 430 to end system 450.

Figure 5:
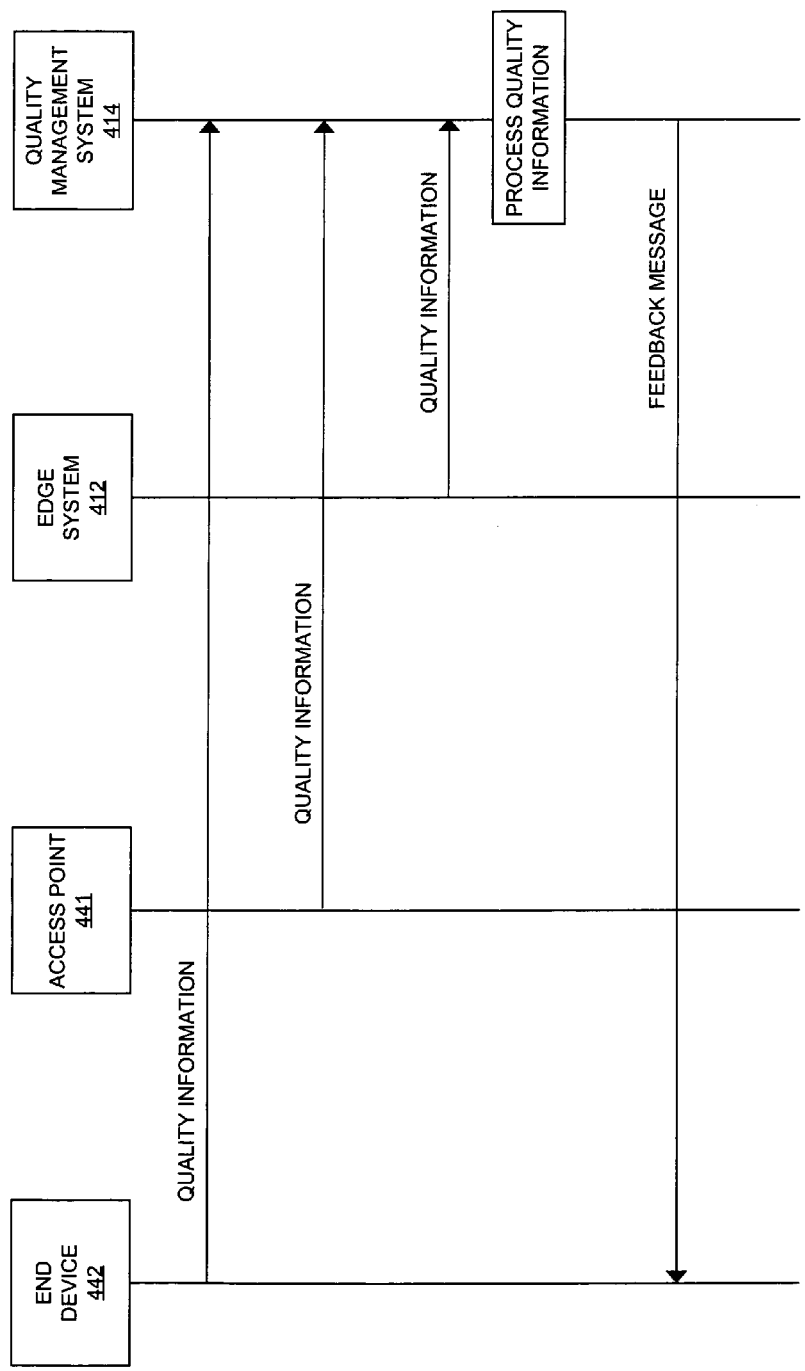
FIG. 5 illustrates the operation of a quality management network in an embodiment of the invention.

During the session, various elements of quality management network 400 are capable of processing session traffic to generate, quality information related to the quality of the session traffic. Examples of quality information include, but are not limited to, bandwidth, packet loss, latency, and jitter information. FIG. 5 illustrates a flow diagram in an embodiment of the invention whereby quality information is sent to QMS 414.

To begin, end device 442 transmits quality information to QMS 414. The information could be sent at the beginning, end, or during a session. Access point 442 also transmits quality information to QMS 414. Lastly, edge system 412 transmits quality information to QMS 414. The quality information could be in the form of quality messages, such as RTCP packets, as well as other types of quality messages.

QMS 414 processes the quality information to determine the overall quality of the session, the appropriate response to the quality level, and the appropriate entity that should be informed of the response. QMS 414 then generates and transmits a feedback message indicating the response. In this example, QMS 414 transmits the feedback message to end device 442 for review by an end user. In an alternative, QMS 414 could transmit the feedback message to a third party, such as a plan administrator.

Figure 6:
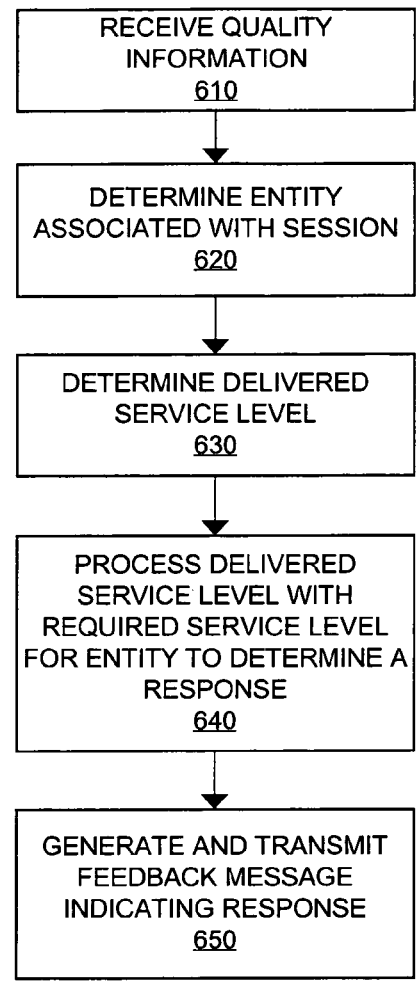
FIG. 6 illustrates the operation of a quality management system in an embodiment of the invention.

FIG. 6 illustrates the operation of QMS 414 in an embodiment of the invention. To begin, QMS 414 receives the quality information from end device 442, access point 441, or edge system 412 (Step 610). QMS 414 processes the quality information to determine an entity associated with the session between end device 442 and end system 450 (Step 620). The entity could be, for example, the end user using end device 442. Alternatively, the entity could be an enterprise associated with the end user, such as a corporation or university. QMS 414 could determine the entity based on a user identification included in the session traffic, such as a session initiation protocol (SIP) identification.

Next, QMS 414 determines a delivered service level for the session (Step 630). For instance, QMS 414 could process bandwidth, jitter, or packet loss statistics to determine a quality of service rating for the session. QMS 414 also determines the required service level for the session based on the entity. QMS 414 could perform a lookup to a service level agreement database to determine the required service level for the entity. QMS 414 then processes the delivered service level with the required service level to determine a quality of service response to the session (Step 640). The response could be a remedy to a session having a delivered service level less than the required service level. Examples include service minute credits.

Upon determining the response, QMS 414 generates and transmits the feedback message indicating the response. The entity receives the feedback message and is thereby notified that the service provider to which the entity subscribes for service is aware of the low quality of service experienced on the past session. The entity is further notified of a remedy to the low quality of service.

Figure 7:
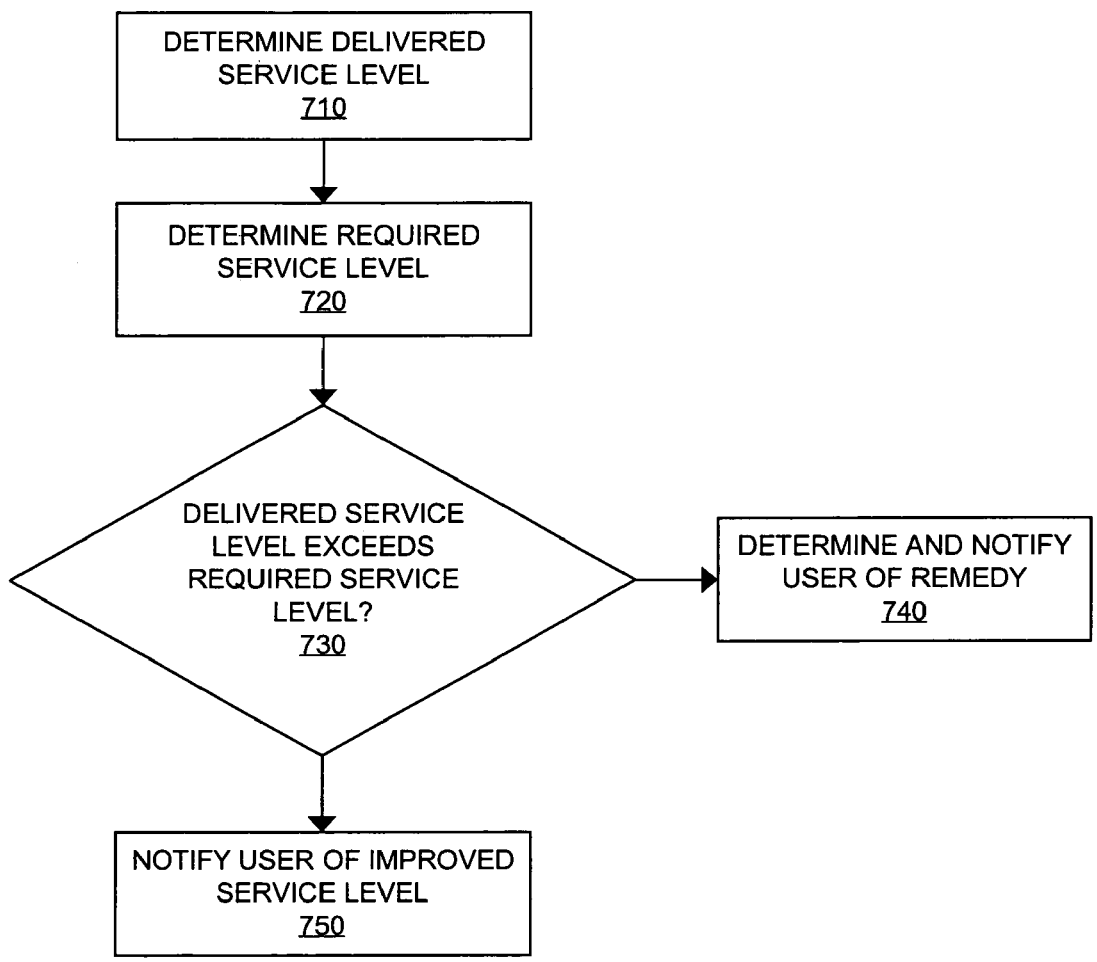
FIG. 7 illustrates the operation of a quality management system in an embodiment of the invention.

FIG. 7 also illustrates the operation of QMS 414 in an embodiment of the invention. In this embodiment, QMS 414 has received quality information for a session and has determined the entity associated with the session. Next, QMS 414 determines the delivered service level for the session (Step 710). Next, QMS 414 determines the required service level for the session based on the entity (Step 720). Upon determining both the required and delivered service levels, QMS 414 determines whether or not the delivered service level exceeded the required service level (Step 730). If so, QMS 414 notifies the entity, such as the end user, that the delivered service level for the session exceeded the required service level (Step 750). If not, QMS 414 determines the remedy for the low quality of service, as described above with respect to FIG. 6.

In an embodiment of the invention, the response to a low quality of service delivered on a session could be in the form of service credits. For example, QMS 414 could determine that the particular session having the low quality of service should be free. In such a case, QMS 414 could transmit a response message to a billing system indicating that the entity should be credited for the session.

Advantageously, quality management network 400 provides for responding on an entity-specific and session by session basis to delivered quality of service levels. In such a manner, entities associated with sessions can be notified of the reasons for low quality of service issues that arise during particular sessions. In addition, entities can be notified of actual and specific responses that will be taken by service providers in response to delivered quality of service levels that do not meet required quality of service levels.

Computer System

FIG. 8

Figure 8:
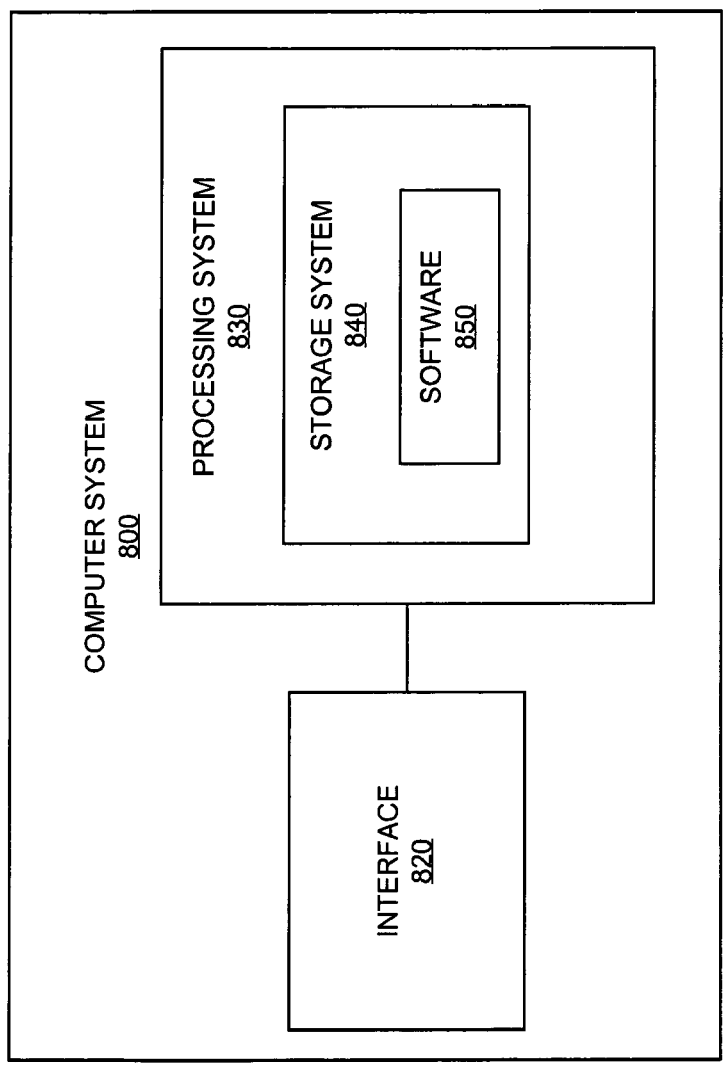
FIG. 8 illustrates a computer system in an embodiment of the invention.

FIG. 8 illustrates computer system 800 in an embodiment of the invention. Computer system 800 includes interface 820, processing system 830, storage system 840, and software 850. Storage system 840 stores software 850. Processing system 830 is linked to interface 820. Computer system 800 could be comprised of a programmed general-purpose computer, although those skilled in the art will appreciate that programmable or special purpose circuitry and equipment may be used. Computer system 800 may use a client server architecture where operations are distributed among a server system and client devices that together comprise elements 820-850.

Interface 820 could comprise a network interface card, modem, port, or some other communication device. Signaling interface 820 may be distributed among multiple communication devices. Interface 820 could comprise a computer microprocessor, logic circuit, or some other processing device. Processing system 830 may be distributed among multiple processing devices. Storage system 840 could comprise a disk, tape, integrated circuit, server, or some other memory device. Storage system 840 may be distributed among multiple memory devices.

Processing system 830 retrieves and executes software 850 from storage system 840. Software 850 may comprise an operating system, utilities, drivers, networking software, and other software typically loaded onto a general-purpose computer. Software 850 could also comprise an application program, firmware, or some other form of machine-readable processing instructions. When executed by the processing system 830, software 850 directs processing system 830 to operate as described for quality management systems 115 and 414.

What is claimed is:

1. A communication network for establishing a session between a first end user device and a second end user device, the communication network comprising:
a service provider, wherein the first and second end user devices establish the session through the service provider; and
a quality management system, wherein the quality management system is a part of the service provider and wherein the quality management system receives quality information for the session having traffic transported by the communication network between the first end user and the second end user, processes the quality information to determine the first end user associated with the session, a required service level for the first end user, and a delivered service level for the session, processes the delivered service level with the required service level to determine a response to be taken by the service provider for the session, wherein the response to be taken by the service provider comprises a notification that the delivered service level was of a higher quality than the required service level and an upgrade offer, generates a feedback message indicating the response to be taken by the service provider, and transmits the feedback message to the first end user.

2. The quality management system of claim 1 wherein the quality management system receives the quality information from the first end user.

3. The quality management system of claim 1 wherein the quality management system receives the quality information from an intermediate system in the communication network.

4. The quality management system of claim 1 wherein the quality management system receives a real time control protocol (RTCP) message indicating the quality information.

5. The quality management system of claim 1 wherein the response to be taken by the service provider comprises a notification that the delivered service level was of a lower quality than the required service level and service credits.

6. A method of operating a communication network for establishing a session through a service provider between a first end user device and a second end user device, the method comprising:
in a quality management system, wherein the quality management system is a part of the service provider, receiving quality information for the session having traffic transported by the communication network between the first end user and the second end user;
processing the quality information to determine the first end user associated with the session, a required service level for the first end user, and a delivered service level for the session;
processing the delivered service level with the required service level to determine a response to be taken by the service provider for the session, wherein the response to be taken by the service provider comprises a notification that the delivered service level was of a higher quality than the required service level and an upgrade offer;
generating a feedback message indicating the response to be taken by the service provider; and
transmitting the feedback message to the first end user.

7. The method of claim 6 wherein the quality management system receives the quality information from the first end user.

8. The method of claim 6 wherein the quality management system receives the quality information from an intermediate system in the communication network.

9. The method of claim 6 wherein the quality management system receives a real time control protocol (RTCP) message indicating the quality information.

10. The method of claim 6 wherein the response to be taken by the service provider comprises a notification that the delivered service level was of a lower quality than the required service level and service credits.

11. A communication network for establishing a session having traffic transported by the communication network between a first end user and a second end user, the communication network comprising:

a service provider, wherein the first and second end user devices establish the session through the service provider;

a quality management system, wherein the quality management system is a part of the service provider and wherein the quality management system is configured to receive quality information for the session, process the quality information to determine the first end user and the second end user associated with the session, determine a required service level for the first end user and the second end user and determine a delivered service level for the session, process the delivered service level with the required service level to determine a response to be taken by the service provider for the session, wherein the response to be taken by the service provider comprises a notification that the delivered service level was of a higher quality than the required service level and an upgrade offer, generate a feedback message indicating the response to be taken by the service provider, and transmit the feedback message to the first end user and the second end user.

12. The quality management network of claim 11 wherein the quality management system receives the quality information from the first end user and the second end user.

13. The quality management network of claim 11 wherein the quality management system receives the quality information from an intermediate system in the communication network.

14. The quality management network of claim 11 wherein the quality management system receives a real time control protocol (RTCP) message indicating the quality information.

15. The quality management network of claim 11 wherein the response to be taken by the service provider comprises a notification that the delivered service level was of a lower quality than the required service level and service credits.

16. A non-transitory computer readable storage medium, having instructions stored thereon for operating a communication network for establishing a session between a first end user device and a second end user device, wherein execution of the instructions by a computer system, direct the computer system to:

receive quality information for the session having traffic transported by the communication network between the first end user and the second end user, process the quality information to determine the first end user associated with the session, a required service level for the first end user, and a delivered service level for the session, process the delivered service level with the required service level to determine a response to be taken by the service provider for the session, wherein the response to be taken by the service provider comprises a notification that the delivered service level was of a higher quality than the required service level and an upgrade offer, generate a feedback message indicating the response to be taken by the service provider, and transmit the feedback message to the first end user.

* * * * *